(No Model.)
H. A. HARVEY.
SCREW TAP.
No. 327,263.  Patented Sept. 29, 1885.
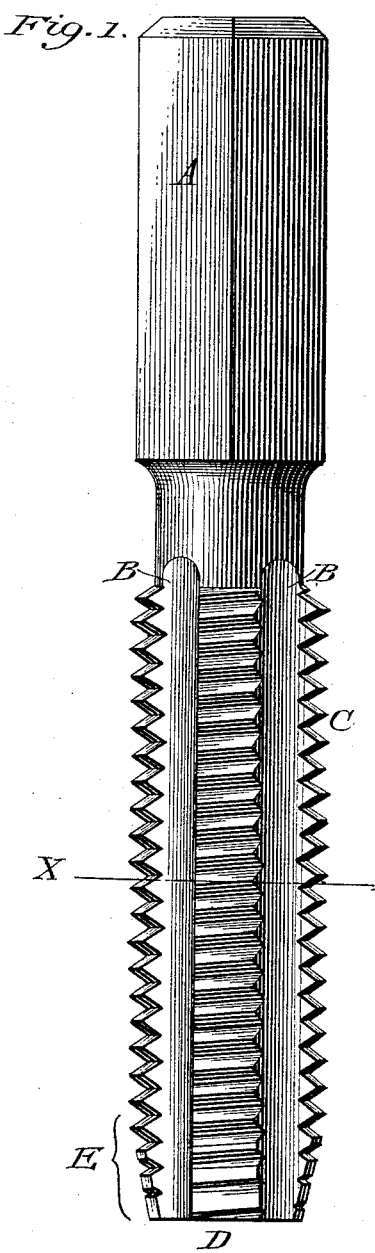
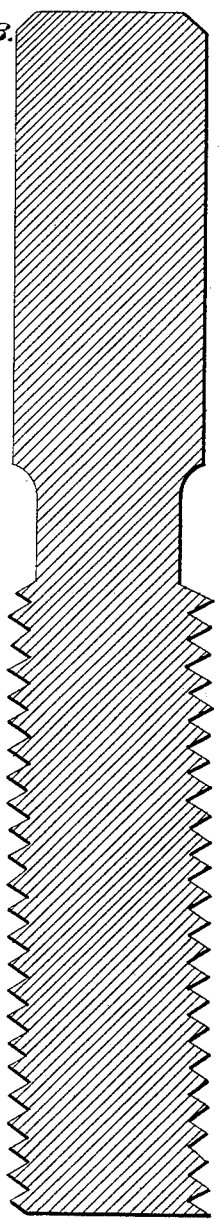
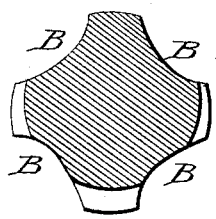
Witnesses:
R. C. Hawes
M. L. Adams
Inventor:
H. A. Harvey

UNITED STATES PATENT OFFICE.

HAYWARD A. HARVEY, OF ORANGE, NEW JERSEY.

SCREW-TAP.

SPECIFICATION forming part of Letters Patent No. 327,263, dated September 29, 1885.

Application filed March 23, 1885. (No model.)

*To all whom it may concern:*

Be it known that I, HAYWARD A. HARVEY, of Orange, New Jersey, have invented an Improved Screw-Tap, of which the following is a specification.

The object of my invention is to increase the durability of taps employed for cutting screw-threads in nuts. Ordinarily such taps are made by first cutting the body of the tap in the form of a screw, and then grooving it longitudinally.

The structure of steel bars seems analogous to that of an object having a comparatively tough, strong skin; hence the operation of cutting the screw-thread of the tap involves cutting through the skin of the bar, which I desire to avoid.

To that end my invention consists in a screw-tap the screw-thread of which has been produced by means of rolling-dies so acting upon the surface of the blank as to gather and crowd the metal radially outward, thereby forming a thread which has unusual tenacity, so that after the longitudinal grooves are made in the tap the ends of the several convolutions of the thread which constitute the cutting-teeth of the tap are much stronger and the tap is much more durable than when made in the ordinary way by cutting out the metal to form the spiral thread around its body.

In the accompanying drawings, Figure 1 represents in elevation a large-sized V-threaded screw-tap constructed according to my invention. Fig. 2 is a transverse section of the same, taken through the line *x x* on Fig. 1. Fig. 3 is a central longitudinal section of the tap-blank upon which the spiral thread has been rolled preparatory to cutting the longitudinal grooves on the blank for the purpose of converting it into a screw-tap with the proper cutting-teeth.

The tap represented in the drawings is of a common form, having a square head, A, having its body provided with the longitudinal grooves B B B B, formed around its body and having a rolled screw-thread, C, the convolutions of which are intersected by the said grooves. Near the point D of the tap its body has the usual slight taper, E, the diameter of the point being, as is usual in this kind of tap, made slightly less than the diameter of the core of the tap, measuring from the base of the screw-thread on one side to the base of the screw-thread on the other side of the tap.

My invention is applicable to screw-taps having threads of various shapes.

For forming the threads I prefer to employ a machine having a rotating cylindrical die and a stationary curved die, along the concave face of which the blank is rolled by the action upon it of the rotating die. The face of the rotating die has formed upon it parallel ribs inclined in one direction, and the face of the stationary die like parallel ribs inclined in the opposite direction. The shape in cross-section of the recesses in the faces of the dies is that which it is intended the tap-thread shall have. As such machines are now well known they do not need especial description herein.

By the act of rolling the threads the metal composing them is compacted, and is rendered peculiarly tough, and is yet capable of taking the proper temper and retaining it with great persistency.

Owing to the fact that the skin of the metal is not severed in the act of forming the thread, the tap may be safely given a somewhat higher temper than that ordinarily given to screw-taps without danger of its breaking when in use, and this higher temper of the tap lessens the amount of wear when in use.

It will of course be understood that the longitudinal grooves in the body of the tap may be varied in number and position, and that they may be made in the usual manner before the tap is tempered.

I claim as my invention—

As a new article of manufacture, a suitably-tempered screw-tap, the cutting-teeth of which are composed of the convolutions of a spiral thread or threads rolled upon the cylindrical portion of the tap and intersected by grooves in the body of the tap and possessing the solidity and toughness of surface due to such rolling.

H. A. HARVEY.

Witnesses:
 M. L. ADAMS,
 R. C. HOWES.